United States Patent
Naim et al.

(10) Patent No.: US 6,678,517 B2
(45) Date of Patent: Jan. 13, 2004

(54) METHOD AND SYSTEM FOR PROVIDING CONTINUOUS VOICE AND PACKET DATA SERVICES TO A MOBILE STATION

(75) Inventors: Ghassan Naim, Garland, TX (US); Arvind Betrabet, Murphy, TX (US); Vijay Hiremath, Dallas, TX (US); Seshagiri Rao Madhavapeddy, Richardson, TX (US); Pardeep Kohli, Plano, TX (US)

(73) Assignee: Spatial Wireless, Inc., Richardson, TX (US)

(*) Notice: Subject to any disclaimer, the term of this patent is extended or adjusted under 35 U.S.C. 154(b) by 36 days.

(21) Appl. No.: 09/886,097

(22) Filed: Jun. 21, 2001

(65) Prior Publication Data
US 2002/0198019 A1 Dec. 26, 2002

(51) Int. Cl.$^7$ .................................. H04Q 7/20
(52) U.S. Cl. .................. 455/414.1; 455/552.1; 455/553.1
(58) Field of Search ............. 455/414.1, 458, 455/466, 552, 553, 556, 557, 575, 566, 567, 413, 417, 423, 67.1, 452.1, 452.2, 517, 552.1, 553.1; 370/354, 355, 356, 493, 494, 254

(56) References Cited

U.S. PATENT DOCUMENTS

| | | | | |
|---|---|---|---|---|
| 5,664,007 A | * | 9/1997 | Samadi et al. ......... 379/221.01 |
| 6,009,325 A | * | 12/1999 | Retzer et al. ............. 455/434 |
| 6,044,266 A | * | 3/2000 | Kato .......................... 455/422 |
| 6,094,581 A | * | 7/2000 | Fried et al. .................. 455/449 |
| 6,119,021 A | * | 9/2000 | Katz ........................... 455/414 |
| 6,154,662 A | * | 11/2000 | Norton et al. ............. 379/88.03 |
| 6,282,182 B1 | * | 8/2001 | Pecen et al. ................ 370/336 |
| 6,292,781 B1 | * | 9/2001 | Urs et al. ................ 379/93.09 |
| 6,370,390 B1 | * | 4/2002 | Salin et al. ................. 455/426 |
| 6,374,102 B1 | * | 4/2002 | Brachman et al. .......... 455/422 |
| 6,385,451 B1 | * | 5/2002 | Kalliokulju et al. ........ 455/437 |
| 6,501,956 B1 | * | 12/2002 | Weeren et al. .............. 455/463 |
| 6,512,929 B1 | * | 1/2003 | Sandre ....................... 455/512 |

* cited by examiner

*Primary Examiner*—Jean A Gelin
(74) *Attorney, Agent, or Firm*—Haynes and Boone, LLP

(57) ABSTRACT

A method and system is provided for providing packet data service and circuit switch service during the same session to a mobile station (MS) whose capabilities do not allow such services to be provided thereon by the wireless network according to the its specifications. First, a voice service is provided between the MS and a first client through a switch device, the voice service conforming to a predetermined communication protocol. The MS is then notified about an incoming data service request from a second client to transfer a predetermined amount of data. The voice service is disconnected between the switch device and the MS if the user decides to activate the incoming data service. The voice service between the switch device and the first client is still maintained. The data service from the second client to the MS through the switch device is then established. The data service between the switch device and the MS is disconnected while the data service between the switch and the second client is maintained after the predetermined amount of data has been transferred from the second client to the MS. The voice service between the switch and the MS is re-established if needed. Also, the same client can initiate the voice and packet data service request to the same MS.

19 Claims, 8 Drawing Sheets

METHOD AND SYSTEM FOR PROVIDING CONTINUOUS VOICE AND PACKET DATA SERVICES TO A MOBILE STATION

BACKGROUND OF THE INVENTION

The present invention relates generally to data telecommunications, and more particularly, to a data switching method and system for providing services to a wireless mobile user.

In networks and other arrangements, a situation often develops where a user will require many types of services during the same session. In particular, in a wireless network compliant with the specifications of 2.5G and 3G Release 1999, a mobile station may require packet data and voice services at the same time. A good example is conducting a concierge service where a mobile user may require information such as maps, list of restaurants or any other services in the area from a live concierge service representative without being released from its voice connection with the representative. Another example is a complex communication application during which a user may require downloading data files and presentations without getting disconnected from the voice application.

According to the specifications in 2.5G and 3G Release 1999, only mobile stations (MSs) that belong to Class-A can handle simultaneous data and voice services. Class-B MSs, on the other hand, are limited to operating one service type at a time. It is important to note that the majority of MSs that exist in the market today are Class-B because Class-A MSs are currently hard to maintain and expensive to operate.

Unfortunately, as it is known in the current art, a wireless network that is compliant with the specifications of 2.5G and 3G Release 1999 does not allow simultaneous services to Class-B mobile stations. This serves to prevent any incoming service calls to the MS that will contradict with its capabilities.

What is needed is an efficient method for providing packet data and voice services during the same communication session to a wireless MS of Class-B without changing the mobile or the network specifications as defined in 2.5G and 3G Release 1999 wireless generation specifications.

SUMMARY OF THE INVENTION

A method and system is disclosed for providing packet data service and circuit switch service during the same session to a mobile station (MS). In one example, a voice service is first provided between the MS and a client through a switch device, the voice service conforming to a predetermined communication protocol. The MS is then notified about an incoming data service request from the client to transfer a predetermined amount of data. The voice service is disconnected between the switch device and the MS if the client activates the incoming data service. The data service from the client to the MS through the switch device is then established while the voice service between the switch device and the client is maintained. The data service between the switch device and the MS is disconnected while the data service between the switch and the client is maintained after the predetermined amount of data has been transferred from the client to the MS. The voice service between the switch and the MS is re-established if needed. It is understood that the above-described processes can also apply when the voice and the data service requests are generated by different clients.

Accordingly, the present invention provides a method for providing packet data (e.g. email, file transfer etc.) and circuit switch (e.g. voice) services to a mobile user during the same session. As it is known in the art, the mobile station involved may belong to Class-B mobile in 2.5G and 3G Release 1999 wireless specifications.

One advantage of the present invention is that it provides a method to provide both voice and data services to the user without changing an MS or the network specifications. The present invention also provides a method for controlling the operation of other network nodes that play a part in the provisioning of different services to an MS.

Another advantage of the present invention is that it does not require any changes to the current specifications of 2.5G and 3G Release 1999 wireless standards, therefore making the invention applicable to any Class-B mobile station. The present invention is applicable to any radio technology type that could be used by the MS on the air interface.

DESCRIPTION OF THE PREFERRED EMBODIMENT

For the purposes of the present invention, a mobile station (MS) means any wireless device. In the description below, the MSs are compliant with 3G Release 1999 standards or any standards of earlier generations such as 2.5G. Class-B MSs are used as examples only to illustrate that such MSs have a limitation of providing/accepting merely one type of service. Moreover, although the description below illustrates the present invention in the context of wireless communication networks, it is understood that the present invention can also be applied to a wireline environment where communication devices or nodes are connected through fixed wires. Therefore, the MS is only one type of communication device. Other types can be used in the wireline environment for data and voice communication purposes. From time to time, a voice connection may be referred to as a voice call, and a packet data service/connection may be referred to as a packet data call.

Figure 1:
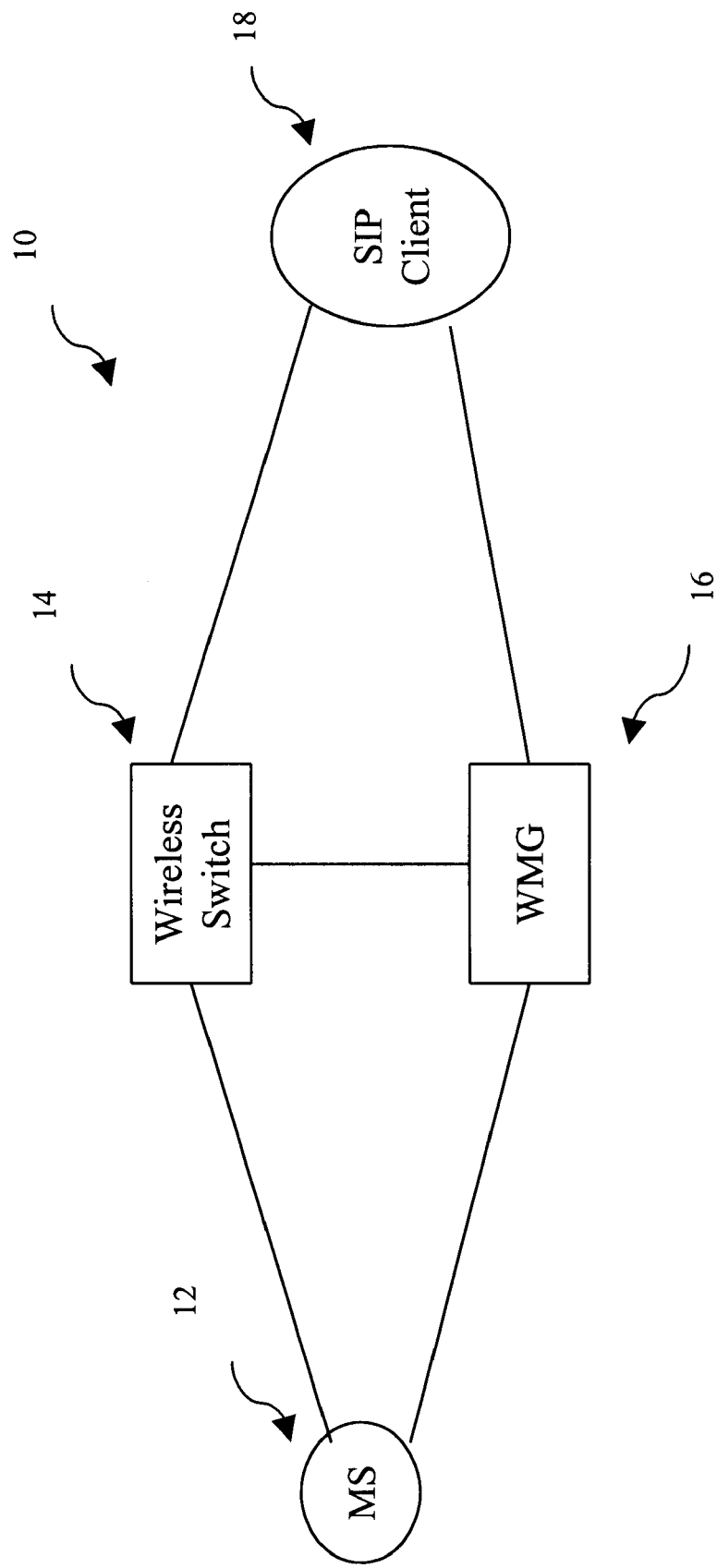
FIG. 1 illustrates a wireless network system with the use of a Wireless Switch (WS) and a Wireless Media Gateway (WMG) for communication with a mobile station (MS).

FIG. 1 illustrates a simplified communication network 10 including an MS 12, a wireless switch (WS) 14, a wireless media gateway (WMG) 16, and one or more Session Initiation Protocol (SIP) Clients 18. As understood by one skilled in the art, there are other nodes in the network that may play a role in transferring data, but they are not mentioned in the following description because they are not relevant to the subject matter of the present invention. The WS and WMG may also have at least one computer microprocessor, memory device, and other necessary components for processing communication instructions. For communications between any two entities or nodes in the network 10, a connection is established which facilitates the information transfer using a specific set of protocols. Although the details of the protocols and the rules used are not discussed in the present invention, it is understood that they are readily available and are fully aware of by one skilled in the art.

In the network 10, all call status information is stored at the WS. Any new call requests or modifications have to be submitted to the WS by the MS or SIP Client. The WS handles the calls and exchanges call information with the MS, the SIP Client and the WMG. The WMG is responsible for transferring application data information between the MS and the SIP Client. The WS controls the WMG operation using various control messages.

For the purpose of the following discussion, two interfaces of the architecture to be considered: the network part and the radio part. The network part refers to the interfaces among the WS, WMG and SIP Client. The radio part refers to the interfaces between the MS and the WS, and between the MS and WMG.

Figure 2A:
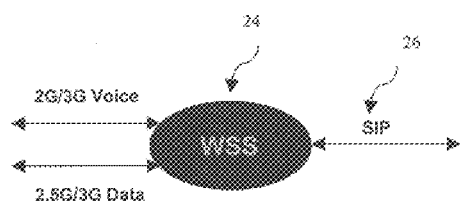
FIG. 2a is a simplified schematic showing a Wireless Soft Switch (WSS) handling both the voice and data service for a Session Initiation Protocol (SIP) Client according to one example of the present invention.
Figure 2B:
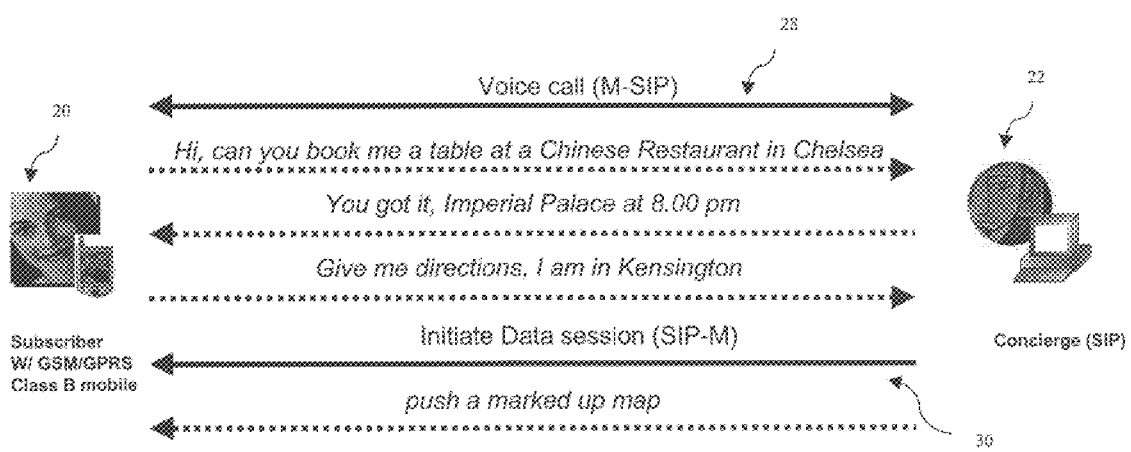
FIG. 2b is a simplified schematic showing a message flow between the SIP Client and the MS according to one example of the present invention.

FIGS. 2a and 2b are conceptual representations of conducting a concierge service involving both voice and data services provided to a subscriber 20 using a Class-B MS and a concierge SIP Client 22. The Wireless Soft Switch (WSS) 24 in the present example is a type of Wireless Switch that has an SIP interface and can handle wireless calls for 2G, 2.5G and 3G mobile phones. WSS also has an SIP interface 26. It is understood that for the purpose of the present invention, WSS and WS may be used interchangeably. It is also understood that SIP is a signaling protocol used to handle signaling messages that control the calls between the MS and a second party.

In FIG. 2b, a concierge service is used as an example to describe the invention, which is applicable to any situation that requires the MS to handle both the voice connection and packet data services without disconnecting either service. In a service application where packet data service is required, the MS would be informed about the incoming packet data call and will be given the option to accept the new data call and put on hold or terminate the current voice call, or reject the incoming packet data call.

In FIG. 2b, a cellular phone user 20 uses a MS 12 (in the form of a personal digital assistant) to communicate with a service center representative at the SIP Client 22. In the concierge service example shown, the cellular phone user 20 is considered to be on a voice call (show as connection 28) with the service center representative. It is assumed that the cellular user at some point in time would verbally require information to be downloaded to the MS 12, e.g., a map or a list of restaurants, etc. For example, the cellular user may ask the representative to book a table in a Chinese restaurant in Chelsea, and the representative verbally confirms that the reservation is completed. The user 20 then asks for directions from Kensington to the restaurant and the representative may respond by providing a driving map to the MS 12. A packet data connection 30 is thus launched from the SIP Client side, and a map is "pushed" on to the MS 12 used by the cellular user 20. In this example, the voice connection is presumed to exist before a packet data connection is established. It is also possible that in some situations a data connection is ongoing while a voice connection is intended to be added.

It is understood that from the wireless network perspective, the voice call is considered as a circuit switch connection, and downloading map information is considered a packet data service. Moreover, in order to send any information to any user-end point from the SIP Client, an end-to-end connection has to be established first, whether it is a voice or data connection. For example, whenever the SIP Client wants to send data to the MS, it usually sends a request message to the WSS 24 requesting a packet data connection with the MS, and the SIP Client must then wait for a confirmation from the WSS before sending any data. Therefore, a call waiting feature can be handled by the WSS as well.

Figure 3:
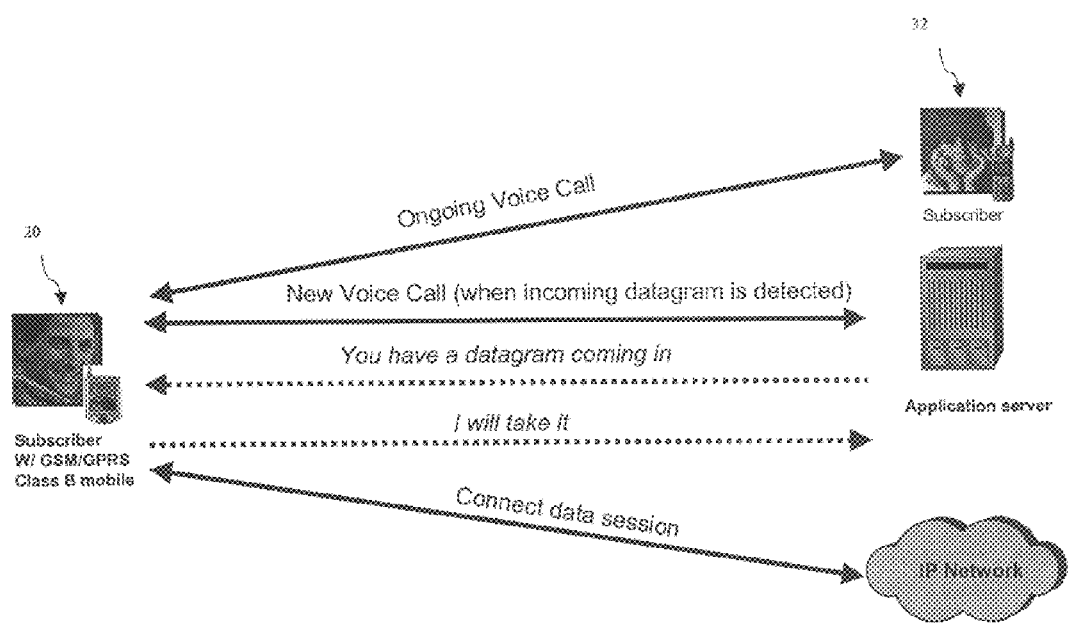
FIG. 3 is a simplified schematic illustrating a call waiting feature for both data and voice services according to one example of the present invention.

Referring to FIG. 3, the first cellular user 20 may be on a voice call with a second cellular/telephone user 32. When a packet/datagram comes in from an SIP Client such as the second user, a recipient application server used by the first user 20 initiates another voice connection with the first user 20 through the WSS asking him/her whether it is desirable for him/her to take on the packet connection. The first user 20 puts the first voice connection on hold, and listens to the second voice connection with the application server. If the first user 20 instructs the application server to establish the packet data connection, the incoming packet data will be downloaded to the appropriate location on the related IP network. Once the data download is complete, the first user 20 can go back to continue his/her conversation with the second user 32.

Figure 4B:
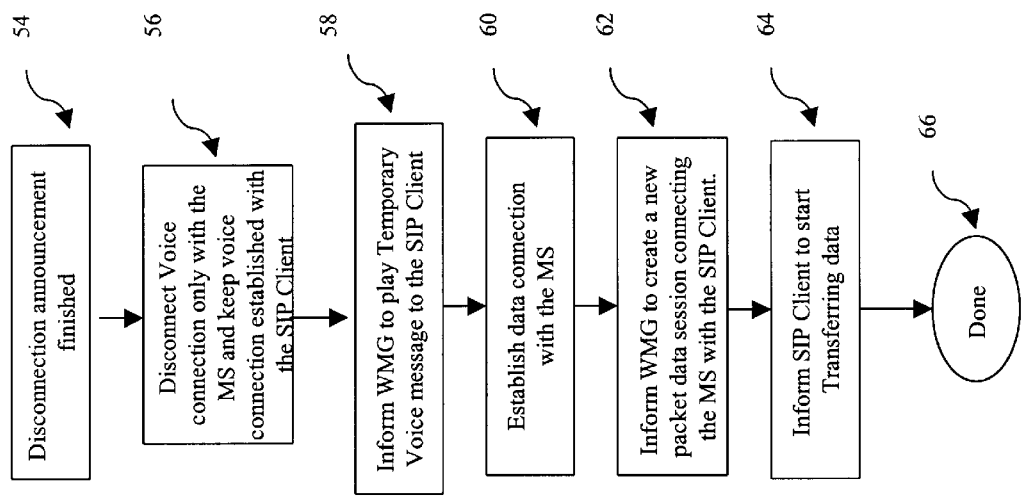
FIGS. 4a, 4b, and 4c are flow diagrams showing process steps taken by the MS, the WS, the WMG, and the SIP Client for providing both the voice and data services according to one example of the present invention.
Figure 4A:
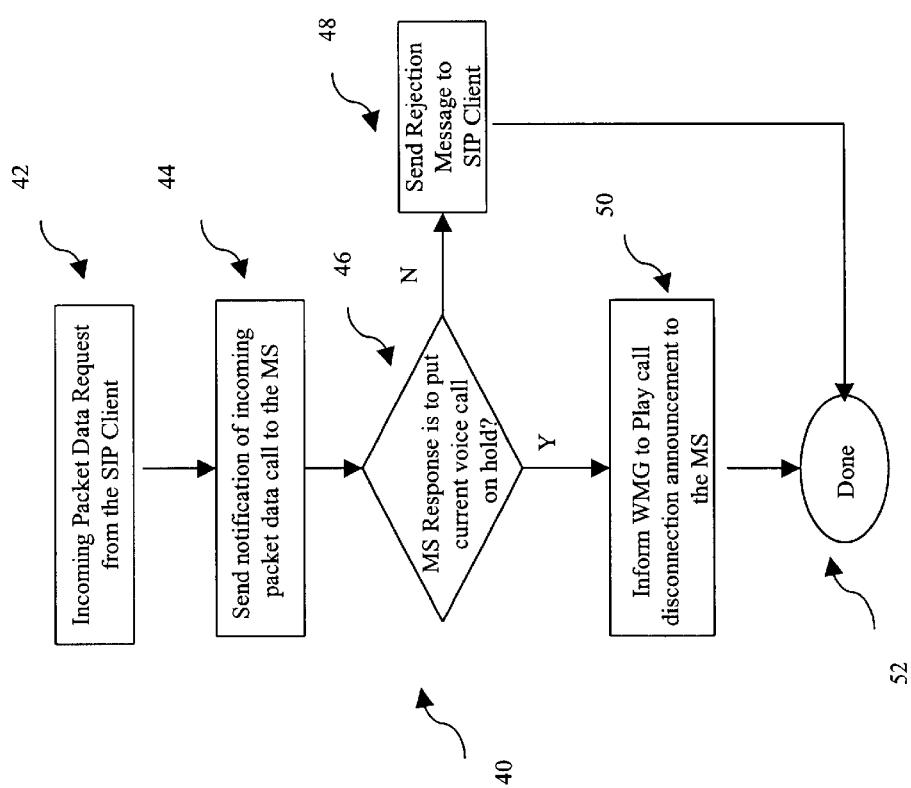

FIG. 4a is a flow diagram 40 illustrating key steps taken when a packet data call is initiated. When an SIP Client sends a packet data request to the WSS in step 42, the WSS sends a notification message to the MS informing it about the incoming packet data call in step 44. If the MS refuses to put the current voice call on hold in step 46, the WSS sends a rejection message to the SIP Client in step 48, and the MS continues with its existing voice call. On the other hand, if the MS responds to the notification message sent by the WSS and indicates that it is going to put the existing voice call on hold, the WSS sends a message to the WMG to play a voice disconnection announcement to the MS in step 50. Either way, the communication process is temporarily concluded (52).

Referring to FIG. 4b, if the MS puts the current voice connection on hold, and once the disconnection announcement is complete in step 54, the WSS, in step 56, disconnects the voice connection only on the radio part, and keeps the voice connection established with the initial SIP Client by informing WMG to play a voice message, music or advertisement back to the initial SIP Client (58). By keeping the voice connection established with the initial SIP Client, a step is saved for re-establishing the voice connection between the MS and the initial SIP Client. Once the voice call is released from the radio side, the MS is willing to accept new packet data connections. The WSS therefore establishes a packet data connection with the MS in step 60, and then informs the WMG to create a new packet data session for connecting the MS with a second SIP Client which is responsible for the upcoming packet data connection. Thereafter, the WSS informs the second SIP Client to start the transfer of data to the MS in step 64. The data transfer between the MS and the second SIP Client is then done through the WMG. The WSS's function is thus completed (step 66).

Figure 4C:
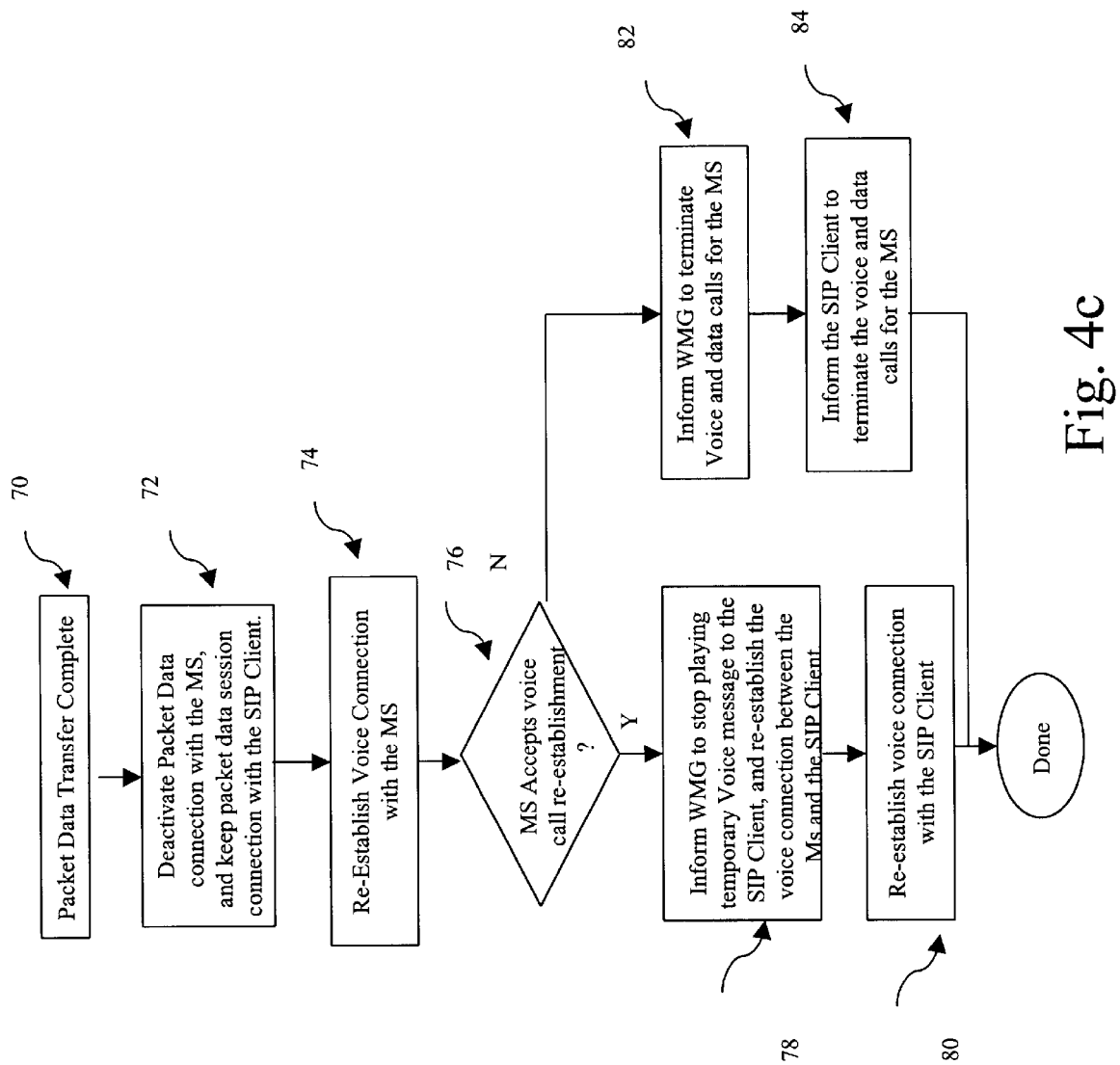

Referring now to FIG. 4c, the voice connection between the MS and the initial SIP Client may be re-established after the data transfer therebetween is complete. For example, once the data transfer is done (step 70), the WSS is immediately informed by the WMG, and commands the MS to de-activate the packet data connection in step 72. The WSS will inform the WMG to put the packet data call on hold with the second SIP Client therefore keeping the packet data connection established on the network in case more data transfer from the same SIP Client will be requested later on. Now that the MS is free again, the WSS intends to establish a voice connection with the MS in step 74. If the user decides to continue the voice call which was put on hold a while ago (step 76), the WSS, in step 78, informs the WMG to stop playing the temporary voice message to the initial SIP Client and to re-connect the voice call between the MS and the initial SIP Client (step 80). If in step 76, the user decides to terminate the call with the initial SIP Client which was put on hold, the WSS informs the WMG and the initial SIP Client to disconnect all existing voice and packet Data connections (steps 82 and 84).

Although the above description may involve multiple SIP Clients, it should also be noted that the voice call and the data call in the above-described process can be generated by the same client. Moreover, the above described processes can be repeated an infinite number of times, therefore allowing the MS to download data anytime during the voice call without loosing the voice connection or establishing a voice call while the MS and an SIP Client have a packet data connection.

Figure 5A:
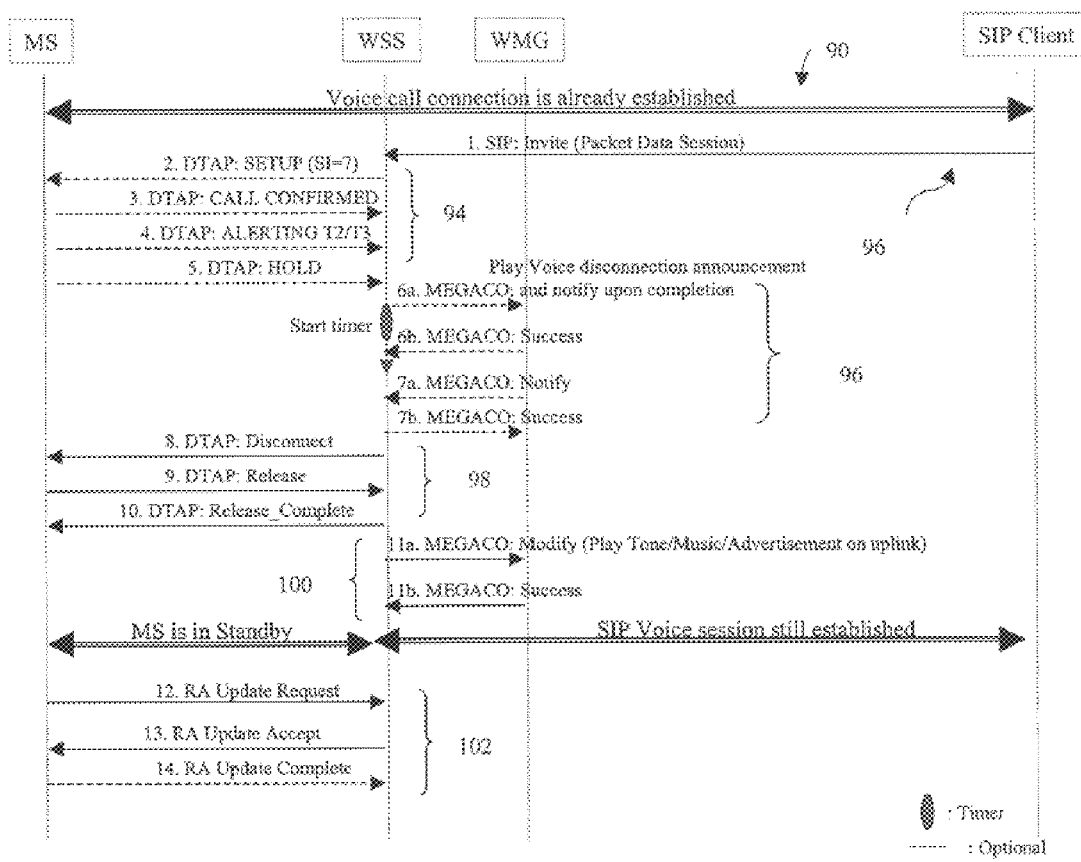
FIGS. 5a, 5b, and 5c illustrate call flow details for providing both the voice and data services according to one example of the present invention.
Figure 5B:
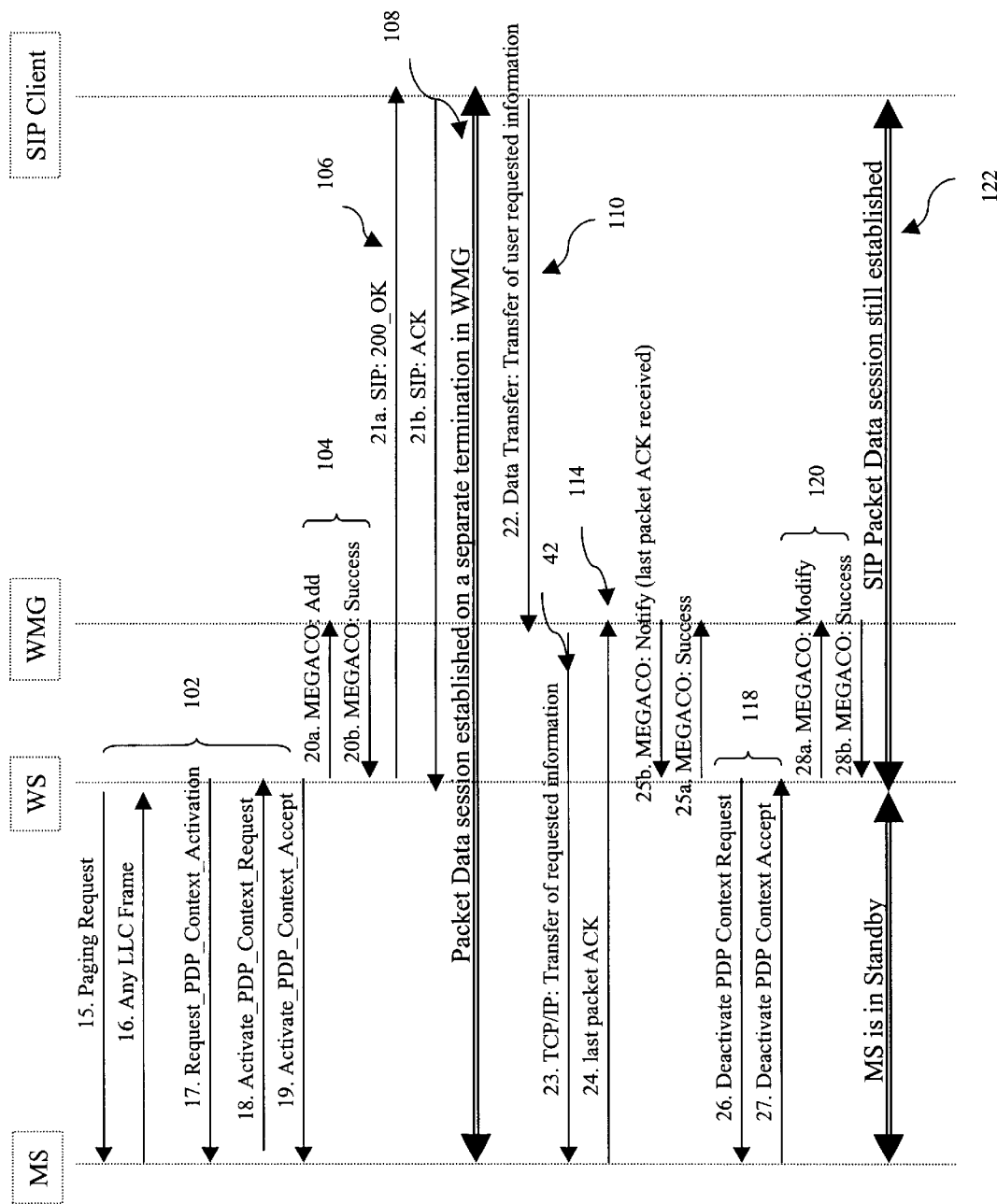
Figure 5C:
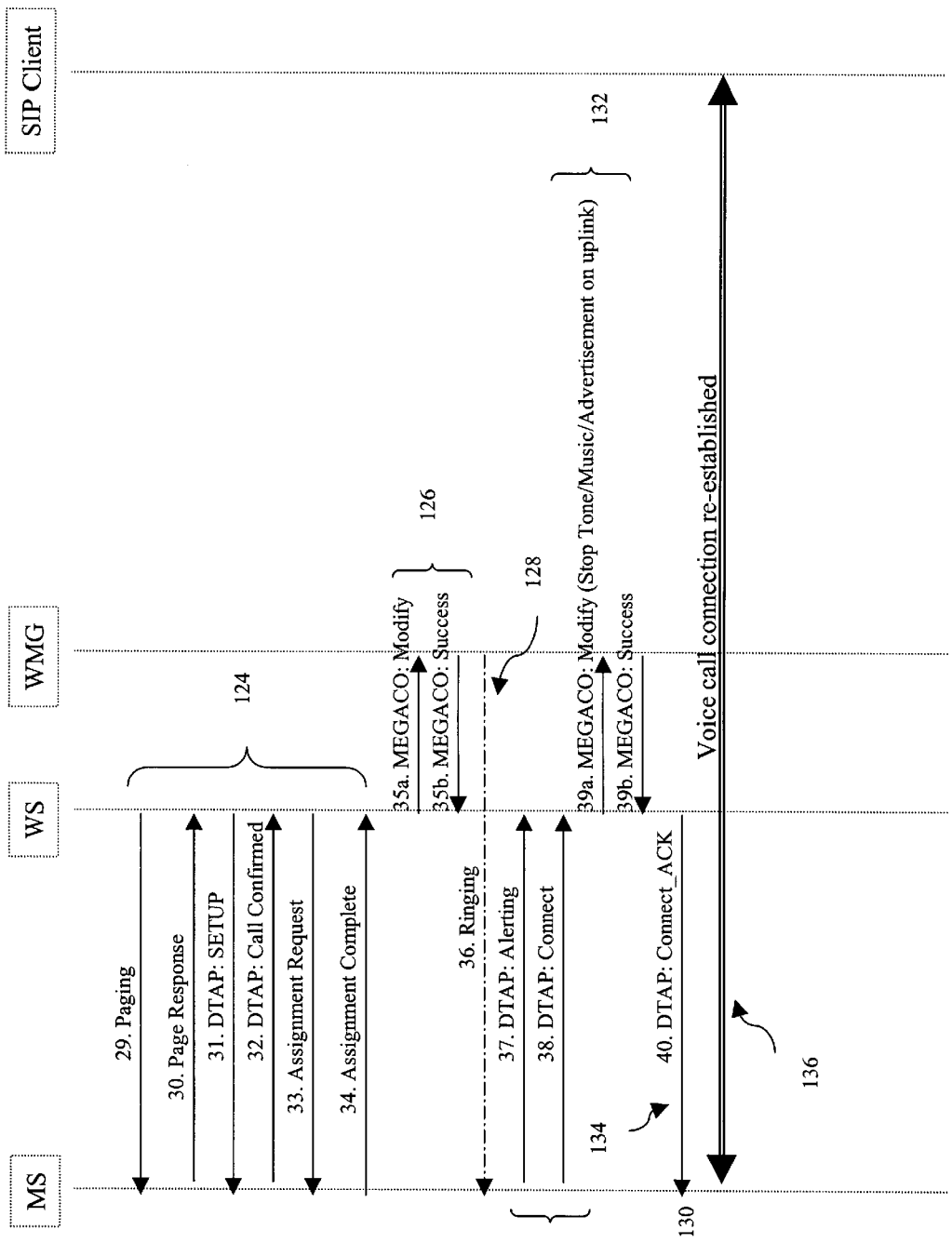

Referring now to FIGS. 5a–c, this series of call flow charts illustrate in more detail all messages used between the MS, the WSS, the WMG, and the SIP Client for using both voice connection and the packet data connection during a concierge service. In this example, the same SIP Client requests voice and data services with the same MS. The messages are intended to conform to 2.5G and 3G Release 1999 standards or well-known protocols in the telecommunication industry such as SIP and MEGACO. As explained above, at the beginning, it is assumed that a voice call connection 90 is in existence between the MS and the SIP Client. The SIP Client sends an Invite message (92) to the WSS for initiating a packet data session. The WSS puts the MS on hold by exchanging messages such as SETUP, Call Confirmed, Alerting T2/T3, and Hold messages (collectively shown by numeral 94). The WSS then uses MEGACO messages for its communication with the WMG (collectively shown by numeral 96) to have the WMG generate voice disconnection message to the MS. Through a set of DTAP messages (98), the WSS and the MS get the voice connection disengaged. The WSS further instructs the WMG through a set of MEGACO messages to play voice messages to the SIP Client (100). At this moment, the MS is in standby state, and the initial SIP Client and the WSS stay connected. Through a series of RA messages between the MS and WSS (102) such as Update Request, Update Accept, and Update Complete, Paging Request, Responding message from the MS such as Request_PDP_Context_Activation, Activation_PDP_Context_Request, and Activate_PDP_Context_Accept, and through a set of information exchange between the WSS and the WMG such as MEGACO messages asking WMG to create context and attach termination point of the MS with the SIP Client (104), the WSS establishes the packet date connection between the MS and the SIP Client (104).

Using data transport protocols such as TCP/IP, the SIP Client transfers data to the WMG (110) and eventually to the MS (112). When the data transfer comes to an end, the MS deactivates the data session by sending a Deactivate_PDP_Context_Request message to WSS (114). The WSS exchanges information with the MS (118) and the WMG (120), and puts the MS in standby again, but keeps the packet data connection with the SIP Client established (122). To re-establish the voice connection between the MS and the SIP Client, the MS and the WSS have to exchange a series of messages 124. After setting up the MS, the WSS communicates with the WMG (126) with MEGACO messages, and has the WMG to ring the MS (128). The MS continues to communicate with the WSS through other messages (130), along with notifications from the WSS to the WMG (132), the voice connection is finally acknowledged by the WSS in a DTAP message to the MS (134). At this point, the voice call connection with the SIP Client is fully re-established.

The present invention as described above thus provides a unique solution for providing both voice and packet data services to a Class-B mobile station during the same call session originated by the cellular subscriber. The solution is achieved by making use of a wireless switch that has an SIP interface to the network and handles call control functionality of all service types used by the MS. It is obvious that the present invention can be applied to any wireless services that mingle both the voice and data connections together including the above described concierge services and Internet call waiting.

The above disclosure provides many different embodiments, or examples, for implementing different features of the invention. These are, of course, merely examples and are not intended to limit the invention. For example, different packet data services such as emergency email (e.g. stock broker information) can be used to put the voice connection on hold and send the email to the MS, then re-establishing the voice connection once the email data transfer is complete. The present invention can also be applied to a wireline environment in which a fixed wireline device which can only do a circuit switch voice call (e.g., a desktop telephone) or a device that only provides data service. It is also contemplated by the present invention that the WMG does not have to be independent, and it can be merged with the switch.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for dynamically switching from a first active service to a second active service provided to a communication device (CD) which is limited to operating either the first or the second service thereon at any time, whereon the first and second active services are different types of services, the method comprising:
providing the first service between the CD and a client conforming to a predetermined communication protocol;
notifying the CD of a request for the second service from the client;
disconnecting the first service between a switch device and the CD if a decision has been made to activate the second service;
maintaining the first service between the switch device and the client;
providing the second service between the CD and the client conforming to a predetermined protocol;
connecting a wireless media gateway (WMG) between the CD and the switch, establishing the second service from the client to the CD through the switch device;

deactivating the second service between the switch device and the CD while maintaining the second service between the switch device and the client after the second service is considered complete for the CD;

re-establishing the first service between the switch device and the CD;

inquiring whether the user desires to continue the first service; and if the user desires to continue the first service, re-establishing the first service between the client and the CD.

2. The method claim 1 further includes disconnecting both the first and second services between the CD and the switch device, the switch device and the client if the user desires not to continue the first service.

3. A method for providing, by a switch device, both voice and data services to a user using a mobile station (MS) which is not limited to operating voice service thereon, the method comprising:

providing a voice service between the MS and a client conforming to a predetermined communication protocol;

notifying the MS an incoming data service request from the client to transfer a predetermined amount of data;

disconnecting the voice service between the switch device and the MS if the user decides to activate the incoming data service;

maintaining the voice service between the switch device and the client;

establishing the data service from the client to the MS through the switch device, deactivating the data service between the switch device and the MS while maintaining the data service between the switch device and the client after the predetermined amount of data has been transferred from the client to the MS;

re-establishing the voice service between the switch device and the MS;

inquiring whether the user desires to continue the voice service; and if the user desires to continue the voice service, re-establishing the voice service between the client and the MS.

4. The method claim 3 further includes disconnecting both the voice and data services between the MS and the switch device, the switch device and the client if the user desires not to continue the voice service.

5. A system for providing both voice and data services to a user using a mobile station (MS) which is limited to operating one service thereon at any time, the system comprising:

at least one microprocessor for processing one or more computer instructions;

at least one memory device for storing the computer instructions, the computer instructions further comprising instructions for:

providing a voice service between the MS and a client through a switch device, the voice service conforming to a predetermined communication protocol;

notifying the MS an incoming data service request from the client to transfer a predetermined amount of data;

disconnecting the voice service between the switch device and the MS if the user decides to activate the incoming data service;

maintaining the voice service between the switch device and the client;

providing a data service between the CD and the client conforming to a predetermined protocol;

connecting a wireless media gateway (WMG) between the CD and the switch, establishing the data service from the client to the MS through the switch;

deactivating the data service between the switch device and the MS while maintaining the data service between the switch device and the client after the predetermined amount of data has been transferred from the client to the MS;

re-establishing the voice service between the switch device and the MS;

inquiring whether the user desires to continue the voice service; and if the user desires to continue the voice service, re-establishing the voice service between the client and the MS.

6. The system of claim 5 further includes instructions for disconnecting both the voice and data services between the MS and the switch device, the switch device and the client if the user desires not to continue the voice service.

7. A switch system for providing both voice and data services to a user using a mobile station (MS) which is not limited to operating voice service thereon, the system comprising:

a switch device for providing a voice service between the MS and a client, the voice service conforming to a predetermined communication protocol, the switch device further comprising:

at least one microprocessor for processing one or more computer instructions; and at least one memory device for storing the computer instructions; the computer instructions further comprising instructions for:

notifying the MS an incoming data service request from a client to transfer a predetermined amount of data;

providing a data service between the CD and the client conforming to a predetermined protocol;

connecting a wireless media gateway (WMG) between the CD and the switch device, disconnecting the voice service between the switch device and the MS if the user decides to activate the incoming data service;

maintaining the voice service between the switch device and the client;

establishing the data service from the client to the MS through the switch device;

deactivating the data service between the switch device and the MS while maintaining the data service between the switch device and the client after the predetermined amount of data has been transferred from the client to the MS;

re-establishing the voice service between the switch device and the MS;

inquiring whether the user desires to continue the voice service; and if the user desires to continue the voice service, re-establishing the voice service between the client and the MS.

8. The system of claim 7 wherein the switch device is a soft switch.

9. The system of claim 7 wherein the switch device further controls a wireless media gateway for providing application data and setting up the data service.

10. A computer program for providing both voice and data services to a user using a mobile station (MS), the program being performed by a switch device for providing a voice service between the MS and a client, the voice service conforming to a predetermined communication protocol; the program comprising instructions for:
- notifying the MS an incoming data service request from a client to transfer a predetermined amount of data;
- disconnecting the voice service between the switch device and the MS if the user decides to activate the incoming data service;
- maintaining the voice service between the switch device and the client;
- establishing the data service from the client to the MS through the switch device;
- deactivating the data service between the switch device and the MS while maintaining the data service between the switch device and the client after the predetermined amount of data has been transferred from the client to the MS;
- re-establishing the voice service between the switch device and the MS;
- inquiring whether the user desires to continue the voice service; and
- re-establishing the voice service between the client and the MS responsive to an indication from the MS to continue the voice service.

11. A method for dynamically switching from a first active service to a second active service provided to a mobile station (MS) which is limited to operating either the first or the second service thereon at a time, the first and second active services are of two different types of services, the method comprising:
- providing the first service between the MS and a first client conforming to a predetermined communication protocol;
- notifying the MS a request for the second service from a second client;
- providing the second service between the CD and the client conforming to a predetermined protocol;
- connecting a wireless media gateway (WMG) between the CD and the switch,
- disconnecting the first service between a switch device and the MS if a user of the MS decides to activate the second service;
- maintaining the first service between the switch device and the first client;
- establishing the data service from the second client to the MS through the switch device;
- deactivating the second service between the switch device and the MS while maintaining the second service between the switch device and the second client after the second service is considered complete for the MS; and
- re-establishing the first service between the switch device and the MS.

12. A method for providing, by a switch device, both voice and data services to a user using a mobile station (MS) which is not limited to operating voice service thereon, the method comprising:
- providing a voice service between the MS and a first client conforming to a predetermined communication protocol;
- notifying the MS an incoming data service request from a second client to transfer a predetermined amount of data;
- disconnecting the voice service between the switch device and the MS if the user decides to activate the incoming data service;
- maintaining the voice service between the switch device and the first client;
- providing a data service between the CD and the client conforming to a predetermined protocol;
- connecting a wireless media gateway (WMG) between the CD and the switch,
- establishing the data service from the second client to the MS through the switch device;
- deactivating the data service between the switch device and the MS while maintaining the data service between the switch device and the second client after the predetermined amount of data has been transferred from the second client to the MS;
- re-establishing the voice service between the switch device and the MS;
- inquiring whether the user desires to continue the voice service; and
- if the user desires to continue the voice service, re-establishing the voice service between the first client and the MS.

13. A method for providing both voice and data services to a user using a mobile station (MS), the MS being engaged in a first service, either the voice or data service, through a switch device with a first client, the method comprising:
- notifying the MS an incoming second service request, the incoming second service is of a different type than the first service;
- disconnecting the first service between the switch device and the MS if the user decides to activate the incoming second service;
- maintaining the first service between the switch device and the first client;
- providing the second service between the CD and the client conforming to a predetermined protocol;
- connecting a wireless media gateway (WMG) between the CD and the switch device,
- establishing the second service with the MS through the switch device;
- deactivating the second service between the switch device and the MS after the second service is completed;
- inquiring whether the user desires to continue the first service; and
- re-establishing the first service between the first client and the MS responsive to an indication from the MS to continue the first service.

14. The method of claim 13 wherein the second service is from a second client.

15. The method of claim 14 wherein the deactivating further comprises maintaining the second service between the switch device and the second client.

16. The method of claim 13 wherein the second service is from the first client.

17. The method of claim 13 wherein the switch device is a soft switch.

18. The method of claim 17 wherein the soft switch further controls a wireless media gateway device for providing the first and second services.

19. A method for dynamically switching from a first active service to a second active service provided to a one-line communication device (CD), whereon the first and second active services are different types of services, the method comprising:

providing the first service between the CD and a first client conforming to a predetermined communication protocol;

providing the second service between the CD and the client conforming to a predetermined protocol;

connecting a wireless media gateway (WMG) between the CD and the switch.

notifying the CD of a request for the second service;

disconnecting the first service between a switch device and the CD if a decision has been made to activate the second service;

maintaining the first service between the switch device and the first client;

establishing the second service with the CD through the switch device;

inquiring whether a user of the CD desires to continue the first service after the second service is completed; and if the user desires to continue the first service, re-establishing the first service with the CD, wherein the switch device controls a media gateway device for facilitating the first or second services.

* * * * *